Feb. 11, 1964  G. J. OROZCO  3,121,210
LIMIT STOP FOR MULTITURN POTENTIOMETERS AND THE LIKE
Filed Sept. 11, 1961  2 Sheets-Sheet 1

INVENTOR.
GILBERT J. OROZCO
BY
ATTORNEY

Feb. 11, 1964     G. J. OROZCO     3,121,210
LIMIT STOP FOR MULTITURN POTENTIOMETERS AND THE LIKE
Filed Sept. 11, 1961     2 Sheets-Sheet 2

INVENTOR.
GILBERT J. OROZCO
BY
ATTORNEY

United States Patent Office 3,121,210
Patented Feb. 11, 1964

3,121,210
LIMIT STOP FOR MULTITURN POTENTIOMETERS
AND THE LIKE
Gilbert J. Orozco, New Rochelle, N.Y., assignor to Litton Industries, Inc., Beverly Hills, Calif.
Filed Sept. 11, 1961, Ser. No. 138,227
20 Claims. (Cl. 338—149)

This invention relates to precision multiturn potentiometers and similar instruments having a rotatable or rotatable-and-axially movable input shaft.

Precision potentiometers and other low-torque instruments are frequently of delicate, light-weight construction, and this presents a problem in providing a positive, rugged limit stop for precise control of the limits of travel of the input shaft. The desired resistance stability and linearity, together with the reduction of friction or torque to a minimum, rule out the use of the contact or slider assembly as a part of the mechanism for stopping the movement of such contact at the predetermined limits of travel.

It is therefore an object of the invention to provide an improved limit stop for instruments of this character which is of simple, rugged construction and is independent of the slider assembly.

Another object of the invention is to provide a limit stop which can be assembled, using the same component parts, to provide any desired multiturn or fractional-turn travel of the adjustment shaft.

Another object of the invention is to provide limit stop mechanism which incorporates a trim adjustment feature for precisely and permanently setting the limits of travel to the exact point desired.

Another object of the invention is to provide an improved shock mounting for the stop mechanism which will not cause the position of the limit of travel of the adjustable shaft to shift after extended use.

Still another object of the invention is to provide an improved stop and switch-operating mechanism for a potentiometer or similar instrument having a rotatable adjustment shaft.

Other objects and advantages of the invention will appear from the following description of the preferred embodiments thereof shown in the accompanying drawings, wherein FIG. 1 is a side elevational view, partly in section, of a multiturn potentiometer embodying the invention;

Figure 1:
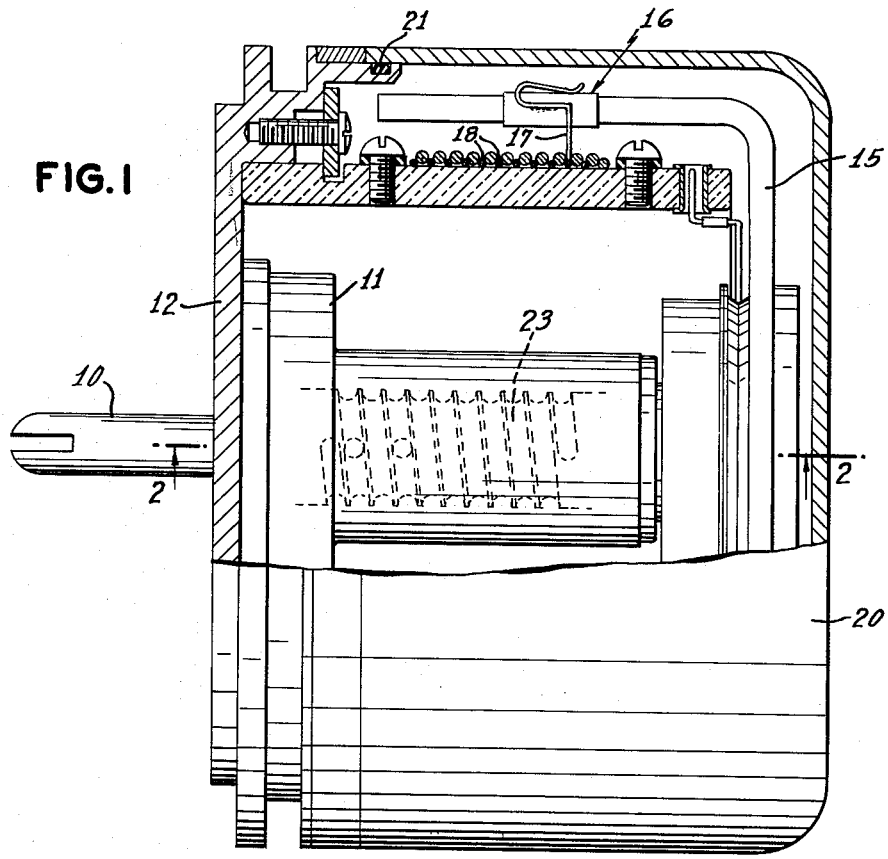

Referring to the drawings, wherein like or corresponding parts are designated by the same reference numbers in the several views, FIG. 1 shows by way of example a multiturn potentiometer embodying limit stop mechanism according to the invention. The potentiometer illustrated is generally similar to that shown in the prior United States Patent No. 2,871,326 granted to J. W. Weidenman and D. S. Rathje on January 27, 1959, the disclosure of which is incorporated herein by reference. The potentiometer comprises an input or control shaft 10 journaled in a hub 11 which is supported on a mounting plate 12. A rotatable slider arm 15 is attached to the rear end of the shaft 10 and carries a slider assembly 16 provided with a contact member 17 engaging the turns 18 of the resistance element of the potentiometer.

The moving parts and electrical connections of the unit are enclosed by an imperforate dust cap or cover 20 which is sealed by a gasket member 21 extending around the periphery of the mounting plate 12. Obviously the invention may be utilized in other instruments embodying a rotatable input shaft or its equivalent, and requiring a limit stop for the rotation of the shaft.

Figure 2:
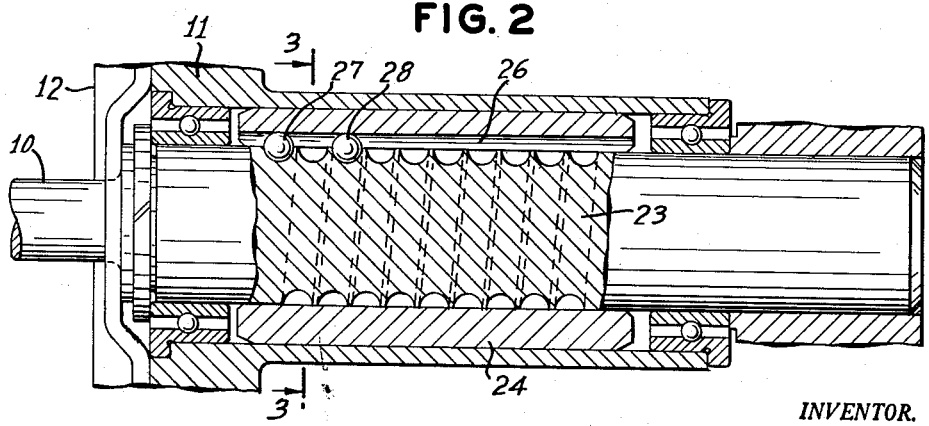
FIG. 2 is a longitudinal sectional view taken on the line 2—2 of FIG. 1.

In accordance with the invention, the rotatable shaft member 10 is provided with a helically grooved concentric portion 23, as shown more clearly in FIG. 2, which may be integral with or keyed to the shaft 10. As shown, a fixed concentric sleeve 24 closely surrounds the multiturn grooved portion 23 of the shaft 10, said sleeve being provided with a longitudinal groove or keyway 26 substantially parallel to the axis of the shaft; however the elements 23 and 24 of the limit stop may be reversed, with the helical groove formed in the fixed sleeve 24. The stop mechanism further comprises two steel balls or spheres 27 and 28, each of a diameter approximating the widths of the grooves in the members 23 and 24, as shown.

With the described construction, it will be evident that the input shaft 10 may turn freely in one direction until the ball 27 engages the end of the helical groove forming an abutment at the front end of the grooved portion 23, and in the other direction until the ball 28 engages the other end of the helical groove. Thus the angular adjustment of the shaft 10 permitted by the stop mechanism may be varied by changing the spacing between the balls 27 and 28 during assembly. Moreover by using only a single ball, the shaft 10 is rotatable for a number of turns equal to the number of convolutions of the helical groove in the shaft.

The invention provides a limit stop which is simple to fabricate for precise angular control movement and is durable and frictionless in operation. In some cases, it is desirable to fix the stopping point of the potentiometer shaft with greater precision than can be effected with ordinary manufacturing tolerances in cutting the helical groove. It will be apparent that in the construction shown, a fine micro-adjustment of the limit position can be readily effected by varying the size of the balls 27 and 28. For most applications, the elements of the stop mechanism are made of metal or alloy but any suitable materials may be used.

Figure 3:
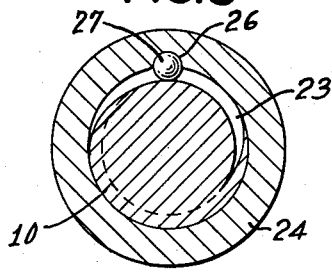
FIG. 3 is a cross-section of the potentiometer shaft and sleeve taken on the line 3—3 of FIG. 2.
Figure 4:
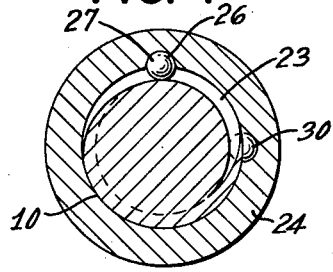
FIG. 4 is a similar view of a modification.

The use of two spaced balls 27 and 28 in the stop mechanism shown in FIGS. 1–3 permits variation of the potentiometer adjustment in one-turn steps, either one or two or three turns, et cetera. If a fractional or intermediate adjustment is desired, the second ball 30 is disposed in a second groove parallel to the groove 26 but angularly displaced therefrom, as shown in FIG. 4. For example, if this groove is displaced 90° in a clockwise direction, the limit stop permits, say, six and three-quarters turns of the shaft 10, depending upon the longitudinal spacing of the balls. By varying the relation of the grooves in sleeve 24, the limits of adjustment of the input shaft 10 can be set at any desired point in assembly, using interchangeable parts.

Figure 5:
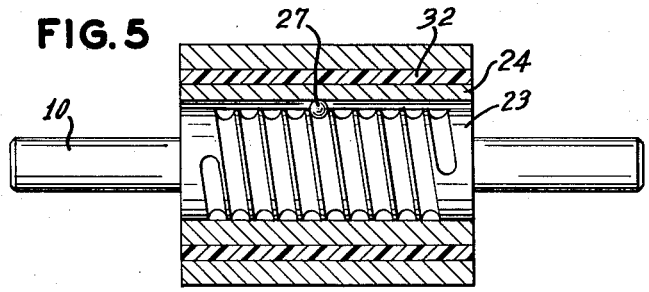
FIGS. 5 and 6 are detailed sectional views showing a preferred shock-mounting feature.
Figure 6:
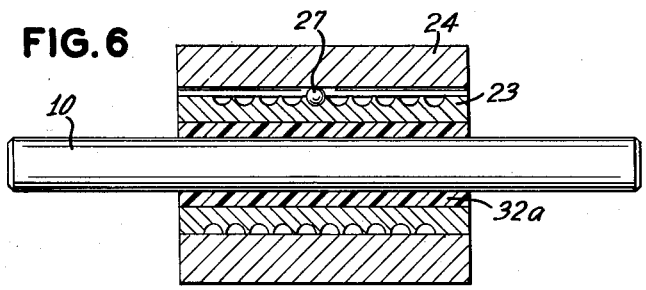

As shown in FIGS. 5 and 6, a rubber or plastic sleeve or lining 32, 32a may be provided as a shock mounting for either the grooved portion 23 or the sleeve 24, if desired. In this manner, the shock or impact at the time when the stop elements engage is cushioned without affecting the stop positions even after extended use.

Figure 7:
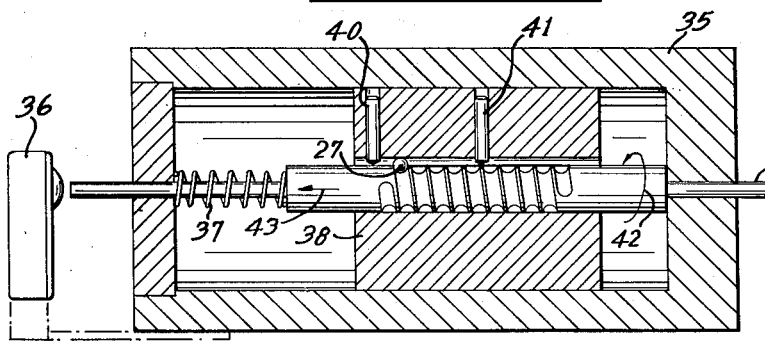
FIG. 7 is a detail view, partly in section, of a modified limit stop device embodying the invention.

In accordance with another feature of the invention, the control device may also be utilized to provide axial movement of the adjustment shaft, for operating a switch or any other purpose. FIG. 7 shows a limit stop device generally similar to that shown in FIGS. 1–3 but comprising a shaft 10a which is mounted in a housing 35 for both rotative and axial movement and utilized to actuate a microswitch 36. The ends of the helical groove form stop abutments on the rotatable shaft, as in the modifications described above. A spring 37 urges the shaft 10a toward the right as viewed in FIG. 7. The concentric sleeve 38, having a longitudinal groove to receive the ball or sphere 27, is also provided with two radial pins 40 and 41 having a predetermined spacing. Assuming for example that there are ten turns in the helical groove on shaft 10a and the pins 40 and 41 are five turns apart, the shaft can be rotated through five turns when the ball 27 is at the left-hand end of the groove (in the direction of the arrow 42) before the ball abuts against the pin 41. Since it cannot move further as the shaft 10a is turned beyond that point, it drives the shaft axially as indicated by the arrow 43, for five more turns. In the reverse movement of the control, first the control shaft is moved axially to the right by the spring 37 until it reaches the normal position shown, then the shaft rotates without axial movement. If desired, the spring 37 may be omitted by utilizing a frictional or retarding device to make the resistance to axial motion of the shaft 10a greater than that to rotation of the shaft. In that case, rotational movement of the shaft in either direction always precedes axial movement. Otherwise the operation is the same as when a spring is provided. The length of the control cycle may be changed by changing the length of the helical groove in the shaft, and changing the spacing of the pins 40 and 41 changes the relative timing of the rotational and axial functions.

While several embodiments of the invention have been shown and described for the purpose of explaining the underlying principles thereof, it will be recognized that many other modifications and alterations may be made without departing from the scope of the invention. For example, the location of the limit stop mechanism in relation to the other parts of the potentiometer may be different from that shown, and the shape and configuration of the intersecting grooves in the fixed and rotatable members may be altered without affecting the mode of operation or the result obtained by the preferred construction described herein.

What is claimed is:

1. In an instrument having a rotatable adjustment shaft, an angularly adjustable element attached to said shaft, said shaft being provided with an integral or attached helically grooved section, a fixed sleeve surrounding said grooved section, said sleeve being provided with at least one longitudinal groove parallel to said shaft, and a locking ball disposed in interlocking relation with the grooves in said section and said sleeve to limit the rotation of said shaft.

2. In an instrument having a rotatable adjustment shaft member, an angularly adjustable element attached to said shaft member, a fixed member adjacent the surface of said shaft member, one of said members being provided with a helical groove and the other member being provided with a longitudinal groove contiguous and substantially perpendicular to the helical groove in the first member, and a locking ball disposed in interlocking relation in both said grooves to limit the rotation of said shaft member.

3. In an instrument having a rotatable adjustment shaft member, an angularly adjustable element attached to said member, said shaft member having an integral or attached grooved section, a fixed grooved sleeve surrounding and contiguous to the surface of said grooved section, said grooved section and grooved sleeve defining intersecting grooves, and at least one locking ball in both of said grooves to limit the rotation of said shaft member.

4. An instrument according to claim 3, in which said fixed sleeve is provided with a plurality of grooves to receive separate locking balls.

5. An instrument according to claim 3, in which shock mounting means is provided for one of the grooved members.

6. An instrument according to claim 3, in which means including the locking ball are provided to control both rotative and axial movement of the adjustment shaft member.

7. In an instrument having an adjustable shaft member rotatable through a plurality of revolutions, an adjustable element attached to said shaft member, said shaft member having a multiturn groove around the periphery thereof, a locking ball disposed in said groove, and stop means engaging said ball at predetermined positions of said shaft member to lock said member against rotation.

8. In an instrument having an adjustable shaft member rotatable through a plurality of revolutions, an adjustable element attached to said shaft member, a fixed sleeve member surrounding said shaft member and provided with a groove substantially parallel to the axis of said shaft member, a locking ball disposed in said groove and means for moving said ball to shaft-locking positions in said groove as the shaft member is rotated.

9. An instrument according to claim 8, in which two locking balls are disposed in said groove to individually control the respective shaft-locking positions.

10. An instrument according to claim 8, in which said fixed sleeve member is provided with two parallel grooves angularly displaced around the shaft, and a locking ball is disposed in each groove to provide fractional-turn stop operation.

11. In a multiturn potentiometer having a rotatable input shaft, a slider assembly attached to said shaft, and stop means to limit the rotation of said shaft, said stop means comprising a locking ball and a fixed sleeve surrounding a portion of said shaft and having a groove substantially parallel to the axis of said shaft, said ball being disposed in said groove.

12. In a multiturn potentiometer having a rotatable input shaft, a slider assembly attached to said shaft, and stop means to limit the rotation of said shaft, said stop means comprising a fixed sleeve surrounding a portion of said shaft and provided with a groove substantially parallel to the axis of said shaft, two locking balls disposed in said groove and means to move both of said balls along said grooves as the shaft is rotated.

13. A multiturn potentiometer according to claim 12, in which said shaft is grooved to receive the inner faces of said balls and move them in said groove.

14. In a multiturn potentiometer having a rotatable input shaft, a slider assembly attached to said shaft, stop means to limit the rotation of said shaft, said stop means comprising a fixed grooved sleeve member surrounding a portion of said shaft and at least one locking ball disposed in the groove in said sleeve member, and an elastic support for said sleeve member to minimize shock when the rotation of the shaft is stopped by said stop means.

15. In a multiturn potentiometer having a rotatable input shaft, a slider assembly attached to said shaft, a sleeve member surrounding and attached to said shaft, cushioning means interposed between said sleeve and said shaft, and stop means including an abutment on said sleeve member for limiting the rotation of said input shaft.

16. In a multiturn potentiometer having a rotatable and axially movable input shaft, a slider assembly attached to said shaft, an electric switch, means including said input shaft for operating said switch upon axial movement thereof, stop means for limiting the rotation of said shaft, said stop means comprising an abutment on said input shaft and a locking ball engaging said abutment in one position of said shaft, said means for operating said switch including said locking ball.

17. A multiturn potentiometer according to claim 16, in which said means for operating said switch upon axial movement of the input shaft includes a fixed sleeve surrounding said shaft and a locking-ball abutment on said sleeve.

18. In a limit stop for a rotatable shaft, in combination, a rotatable part turning with said shaft and provided with an external helical groove, a grooved sleeve surrounding and contiguous to the helical groove in said rotatable part, and with its groove intersecting the convolutions of said helical groove, and at least one locking ball in both of said grooves to retard rotation of said part except when said ball is at a point of intersection of said grooves spaced from an end of one of the grooves.

19. In a limit stop for a rotatable shaft, in combination, a fixed sleeve surrounding a portion of said shaft and having a groove extending along the length of said shaft, a locking ball disposed in said groove, and means on said shaft forming a complementary abutment for said ball with an edge of said groove.

20. A stop assembly comprising two relatively movable members having intersecting grooves formed in the opposed contiguous faces thereof, and a locking ball disposed in said grooves.

References Cited in the file of this patent
UNITED STATES PATENTS

| | | |
|---|---|---|
| 2,716,352 | Wilson | Aug. 30, 1955 |
| 2,871,326 | Weidenman et al. | Jan. 27, 1959 |